Sept. 10, 1935.   H. D. BENNETT   2,013,946
REFRIGERATION
Filed June 6, 1934
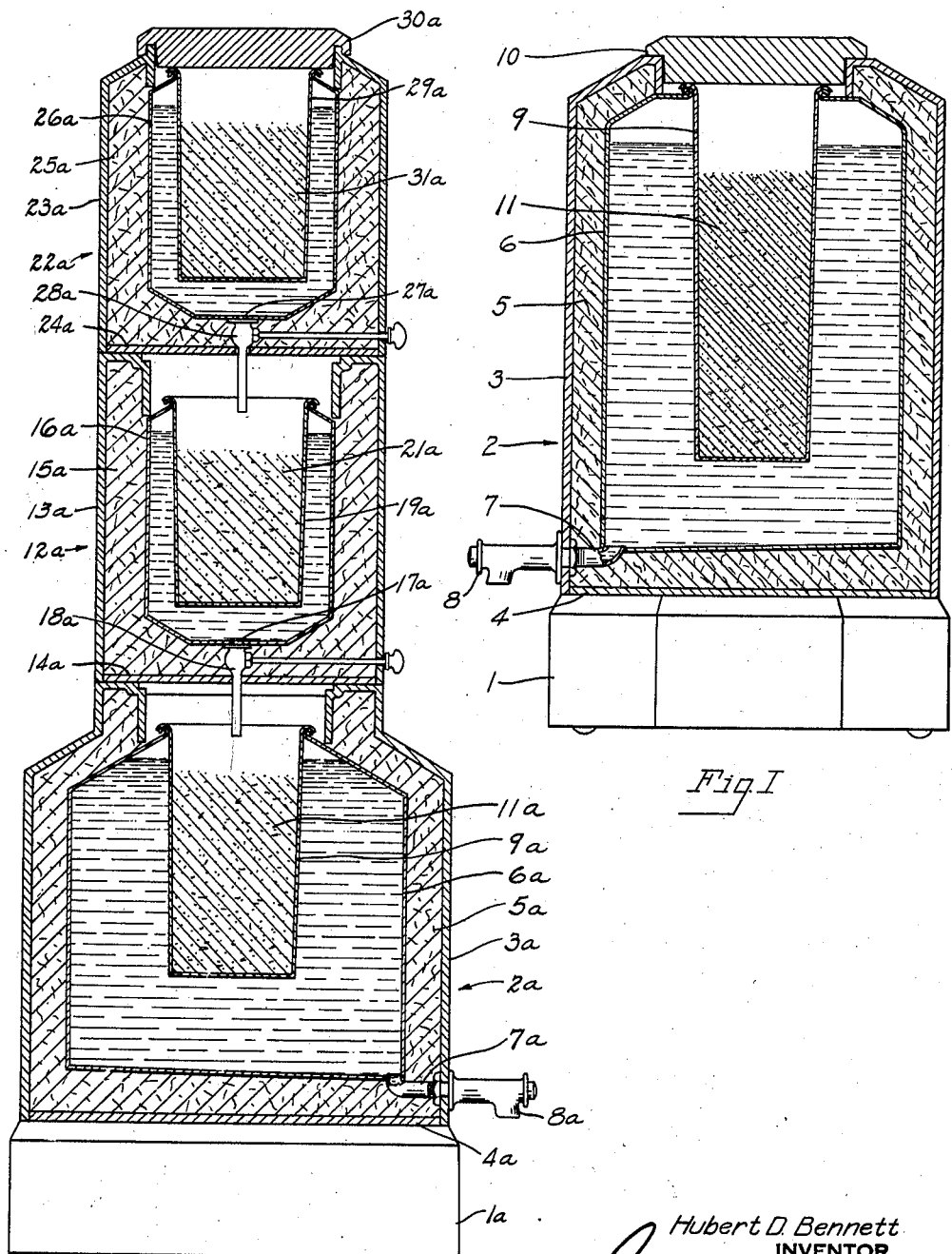
Fig. I
Fig. II
Hubert D. Bennett
INVENTOR
BY  C.O. Marshall.
ATTORNEY Patented Sept. 10, 1935

2,013,946

UNITED STATES PATENT OFFICE 2,013,946

REFRIGERATION

Hubert D. Bennett, Toledo, Ohio, assignor to Toledo Scale Manufacturing Company, Toledo, Ohio, a corporation of New Jersey Application June 6, 1934, Serial No. 729,282

4 Claims. (Cl. 62—94)

This invention relates to the art of refrigeration and one of its principal objects is the provision of a process and apparatus which may be employed for producing refrigerated conditions at will and which utilizes materials that will keep indefinitely at ordinary temperatures and remain at all times ready for use.

Another object of the invention is the provision of means for producing refrigerated conditions, the materials for which are inexpensive and readily obtainable.

Another object of the invention is the provision of a process and apparatus for utilizing the endothermic effect of dissolving substances.

And still a further object is the provision of a process and apparatus for producing refrigerated conditions, the materials utilized in which may be readily and inexpensively reconditioned for reuse.

Other objects and advantages will be apparent from the following description, in which reference is had to the accompanying drawing illustrating preferred embodiments of my invention and wherein similar reference numerals designate similar parts throughout the several views.

In the drawing:—

Figure I is a vertical, partly sectional view showing a simple form of apparatus embodying my invention;

Figure II is a vertical, partly sectional view illustrating a more elaborate form thereof.

The process of my invention may be practiced with or without the use of the apparatus of my invention and the apparatus shown in the drawing is to be regarded as illustrative only.

Referring first to Figure I of the drawing, a base 1, which may be of any preferred design, supports a container 2 having an outer wall 3 and an outer bottom 4 which may be formed of any suitable material, such, for example, as formaldehyde urea resin. Supported within the outer wall 3 and outer bottom 4 and separated therefrom by heat insulating material 5 is a jar 6 which may be made of artificial resin, metal, glass or other durable material, and leading from the interior of the jar 6 to the exterior of the outer wall 3 is a pipe or conduit 7 at the outer end of which is a manually operable faucet 8. Extending downwardly into the jar 6 and supported by the rim of the jar mouth is a cup-like container 9, preferably made of material which is a good conductor of heat. Enclosing the opening of the insulated container 2 and the cup-like container 9 is a heat insulating cover 10. By removing the cover 10 and the cup-like container 9 the interior of the jar 6 is made accessible.

The jar 6 is adapted to contain commodities to be cooled, such, for example, as beverages. The cup-like container 9 contains a charge of a substance 11, the aqueous solution of which has the property of absorbing heat while the substance is dissolving. Various combinations, such as ammonium nitrate, ammonium dichromate, ammonium oxalate and urea, may be employed for this purpose. Because of its heat absorption effect in calories per gram, I prefer to employ ammonium oxalate. Ammonium nitrate is less expensive than ammonium oxalate and its heat absorbing effect is nearly as great. The heat absorbed as each gram of ammonium nitrate dissolves is substantially the same as that absorbed in melting a gram of ice, while the heat absorbed as each gram of ammonium oxalate is dissolved is somewhat greater than that absorbed in melting a gram of ice.

When water is added to the charge in the cup-like container 9 the ammonium oxalate or equivalent substance goes into solution, the temperature of the solution drops and heat passes from the commodity in the jar 6 through the conducting wall of the cup-like container 9 into the cold solution until the temperature of the commodity in the jar 6 and the temperature of the solution in the cup-like container 9 reach a state of equilibrium. Thus beverages or other commodities in the jar 6 can be cooled whenever desired by merely adding to the substance in the cup-like container 9 enough water to dissolve the substance contained therein.

Such cooling materials as ice and solid carbon dioxide absorb heat at ordinary temperatures and thus lose their effectiveness, but the materials utilized in my process and apparatus can be kept indefinitely even under desert conditions and made to exert their cooling effect, by merely adding water, whenever desired. In fact, the hotter and drier the atmospheric conditions under which my process and apparatus is employed the more readily the efficacy of the materials utilized can be restored, since their efficacy is restored by the evaporation of the water of solution. They may be dried by exposure to the atmosphere like solutions of ordinary table salt. Each jar may be supplied with a plurality of charged cups and the cups of dried material may be used in rotation. If at any time it is desired to hasten the drying, this may be done by subjecting the solution or partly dried material to heat. The heat employed should be low enough, however, to avoid decomposition of the substance being dried.

By using the apparatus illustrated in Figure II of the drawing or by using a species of my process in which solvent is precooled, temperatures may be dropped through wide ranges. In the form of device illustrated in Figure II of the drawing a base 1a is surmounted by a container 2a having an outer wall 3a and bottom 4a, enclosing heat insulating material 5a, and a jar 6a provided with an outlet pipe 7a and faucet 8a, the container so far described being similar in construction and arrangement to that illustrated in Figure I. Extending into the jar 6a and supported upon the rim of the jar mouth is a cup-like container 9a charged with a substance 11a, such for example as ammonium oxalate, the dissolving of which has an endothermic effect.

A second container 12a is supported above the container 2a so as to close the mouth of the container 2a, the container 12a having an outer wall 13a and bottom 14a, insulating material 15a and a jar 16a with heat conducting walls; the construction and arrangement of the parts of the container 12a so far mentioned being generally similar to the construction and arrangement of the parts of the device shown in Figure I. The jar 16a is provided with an outlet 17a and a manually controlled cock 18a by means of which the liquid contents of the jar 16a may be discharged into the cup-like container 9a.

The capacity of the cup-like container 19a, charged with substance 21a similar to or identical with substance 11a, is relatively great and preferably approaches one-half the total capacity of the jar 16a.

A third container 22a is supported above the second container 12a so as to close the mouth of the container 12a, the container 22a having an outer wall 23a and bottom 24a, insulating material 25a and a jar 26a with heat conducting walls; the construction and arrangement of the parts of the container 22a so far mentioned being generally similar to the construction and arrangement of the parts of the device shown in Figure I. The jar 26a is provided with an outlet 27a and a manually controlled cock 28a by means of which the liquid contents of the jar 26a may be discharged into the cup-like container 19a.

The capacity of the cup-like container 29a, charged with substance 31a similar to or identical with substance 11a, is relatively great and preferably approaches one-half the total capacity of the jar 26a.

Enclosing the opening in the container 22a and the cup-like container 29a is a heat insulating cover 30a.

The cup-like containers 29a, 19a and 9a being charged with ammonium oxalate or equivalent substance and the jars 26a and 16a containing water, while the jar 6a contains a beverage or other commodity to be cooled, enough water is added to the substance in the jar 29a to dissolve the substance. Heat is absorbed in dissolving the substance contained in the cup-like container 29a, the heat thus absorbed being largely extracted from the water contained in the jar 26a. After the temperatures of the solution in the cup-like container 29a and the water in the jar 26a have reached a state of equilibrium, the cock 28a is opened and the cold water discharged from the jar 26a into the cup-like container 19a where further absorption of heat takes place as the substance in the cup-like container 19a dissolves. Thus the water in the jar 16a is cooled to a temperature below that reached in the jar 26a. The hypercooled water from the jar 16a is then discharged through the cock 18a, the temperature of the resulting solution in the cup 9a thus being dropped still lower. By such series of cooling steps the temperature of the contents of the final jar 6a may be lowered approximately to the freezing point of a saturated solution of the ammonium oxalate or equivalent substance. Obviously the step-by-step temperature lowering process above described may include as many steps as are required to attain any desired temperature above the freezing point of the saturated solution.

The embodiments of my invention herein shown and described are to be regarded as illustrative only, and it is to be understood that the invention is susceptible to variation, modification and change within the spirit and scope of the subjoined claims.

Having described my invention, I claim:

1. In a process of refrigeration, the steps of bringing together a solvent and a solute the dissolving of which has an endothermic effect, in juxtaposition to a second solvent and separated therefrom by a heat conducting partition, whereby said second solvent is cooled, then adding said cooled second solvent to a solute the dissolving of which has an endothermic effect, in juxtaposition to a commodity to be cooled and separated therefrom by a heat conducting partition.

2. In a process of refrigeration, the steps of successively adding solvents to solutes the dissolving of which has an endothermic effect, the solvent of each succeeding addition being precooled by the endothermic effect of dissolving the solute of a preceding batch, the materials of each batch being prevented from comingling with materials of other batches.

3. In a refrigerating apparatus, a heat insulated container, a solvent contained therein, a second container having heat conducting walls extending into the first said container, a material the dissolving of which has an endothermic effect contained in said second container, a third container, said third container being heat insulated and adapted to contain a material to be cooled, a fourth container, said fourth container having heat conducting walls extending into said third container and containing a solute the dissolving of which has an endothermic effect, and means for conducting the solvent from said first container into said fourth container.

4. In a refrigerating device, a series of heat insulated containers, a second series of containers each of which has heat conducting walls extending into one of said heat insulated containers, each container of said second series containing a material the dissolving of which has an endothermic effect, and means for conducting a solvent from certain of said heat insulated containers into certain containers of said second series.

HUBERT D. BENNETT.